United States Patent
Rong et al.

(10) Patent No.: US 10,879,777 B2
(45) Date of Patent: Dec. 29, 2020

(54) RAPID STRESS RELIEF ANNEALING OF A STATOR

(71) Applicant: Ford Global Technologies, LLC, Dearborn, MI (US)

(72) Inventors: Chuanbing Rong, Canton, MI (US); Feng Liang, Troy, MI (US); Michael W. Degner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 300 days.

(21) Appl. No.: 15/837,108

(22) Filed: Dec. 11, 2017

(65) Prior Publication Data

US 2019/0181734 A1    Jun. 13, 2019

(51) Int. Cl.
| | |
|---|---|
| H02K 15/12 | (2006.01) |
| H02K 1/12 | (2006.01) |
| H02K 1/02 | (2006.01) |
| H02K 15/02 | (2006.01) |
| H02K 1/27 | (2006.01) |
| H01F 41/02 | (2006.01) |

(52) U.S. Cl.
CPC ............. *H02K 15/12* (2013.01); *H02K 1/02* (2013.01); *H02K 1/12* (2013.01); *H02K 15/02* (2013.01); *H01F 41/0233* (2013.01); *H02K 1/274* (2013.01); *H02K 1/2766* (2013.01); *H02K 2213/03* (2013.01)

(58) Field of Classification Search
CPC .... H01F 41/0233; H02K 15/02; H02K 15/12; H02K 1/02; H02K 1/12; H02K 1/274; H02K 1/2766; H02K 2213/03
See application file for complete search history.

(56) References Cited

U.S. PATENT DOCUMENTS

| | | | |
|---|---|---|---|
| 4,726,855 A | 2/1988 | Tsutsui et al. | |
| 5,256,211 A | 10/1993 | Silgailis et al. | |
| 10,199,910 B2* | 2/2019 | Liang | H02K 15/02 |
| 10,544,489 B2* | 1/2020 | Kakiuchi | C22C 38/001 |
| 2014/0250681 A1 | 9/2014 | Johnston | |
| 2016/0099635 A1 | 4/2016 | Liang et al. | |
| 2016/0111190 A1 | 4/2016 | Boettcher et al. | |
| 2019/0181734 A1* | 6/2019 | Rong | H02K 1/12 |

FOREIGN PATENT DOCUMENTS

JP          S61174612 A          8/1986

* cited by examiner

*Primary Examiner* — Minh N Trinh
(74) *Attorney, Agent, or Firm* — David Kelley; Brooks Kushman, P.C.

(57) ABSTRACT

A method of manufacturing a stator is provided. The method may include stamping a fully-processed steel into a set of laminations having hardened outer edge areas. The method may further include flash annealing the laminations to concentrate thermal energy in the inner and outer edge areas relative to central areas of the laminations to drive a hardness of the inner and outer edge areas toward a hardness of the central areas to relieve residual stress and decrease iron loss of the laminations.

11 Claims, 4 Drawing Sheets

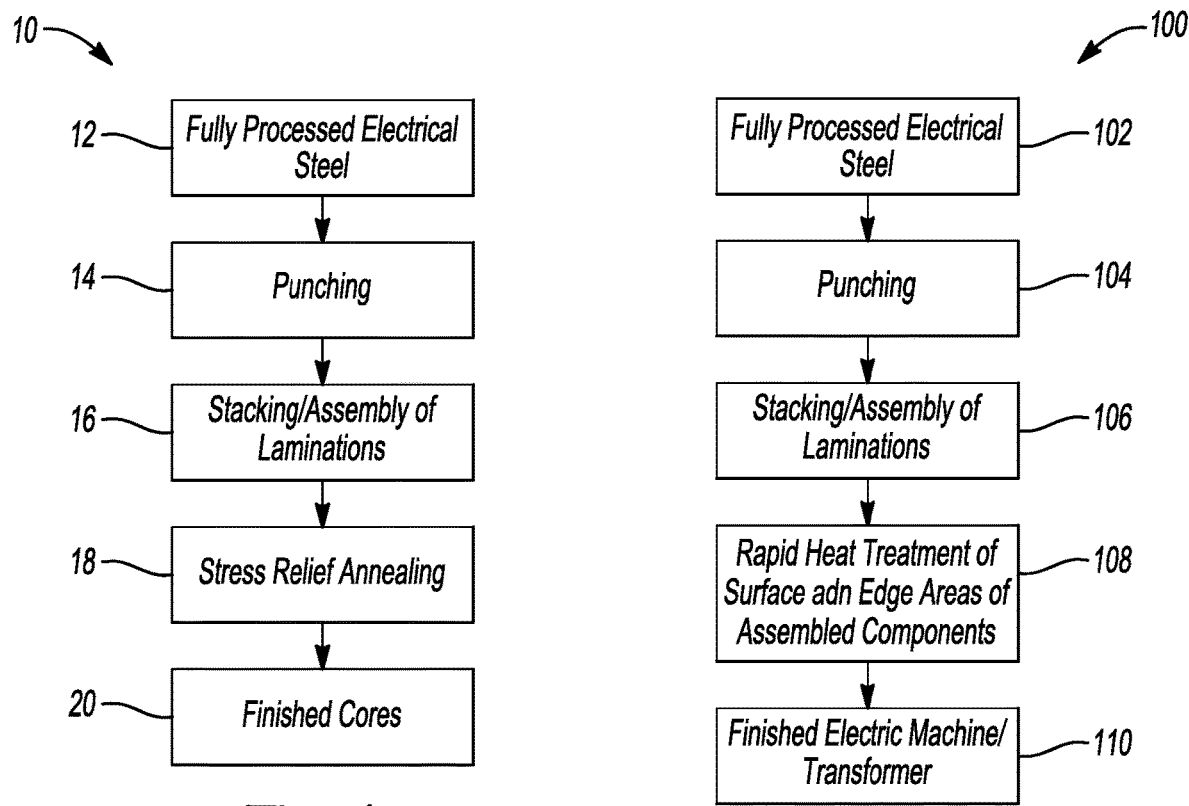

RAPID STRESS RELIEF ANNEALING OF A STATOR

TECHNICAL FIELD

The present disclosure relates to a heat-treating process for steel used in electric machines.

BACKGROUND

Electrical steel is a unique steel used to produce specific magnetic properties. Electrical steel is usually manufactured in cold-rolled strips less than 2 mm thick. These strips are cut to shape to form the laminated cores for transformers, and the stator and the rotor of electric motors. The electrical steel is often cut to shape by stamping, a process of placing a flat portion of steel in a die, pressing it with a tool to form the desired surface. Stamping electrical steel may induce residual stress, the internal stress distribution locked into a material. This stress is present even without an external load applied to the material.

Residual stress in electrical components leads to core loss and a decrease in energy efficiency. Core loss is present in certain devices that include a core subjected to a changing magnetic field, such as transformers, inductors, AC motors, and alternators. Ideally, the magnetic field that is transferred through the device may be lost in the core, and dissipated by heat or noise, or both. The residual stress, and in turn, core loss may be reduced by a metal working process called annealing. Annealing is a heat treatment process that alters the physical and sometimes chemical properties of the material being treated. Generally, annealing is performed by applying 750° C. for at least thirty minutes or even a few hours. A cycle time greater than 30 minutes results in a costly production process.

SUMMARY

According to one embodiment of this disclosure a method of manufacturing a stator is provided. The method may include stamping a fully-processed steel into a set of laminations having hardened outer edge areas. The method may further include flash annealing the laminations to concentrate thermal energy in the inner and outer edge areas relative to central areas of the laminations to drive a hardness of the inner and outer edge areas toward a hardness of the central areas to relieve residual stress and decrease iron loss of the laminations.

According to another embodiment of this disclosure, a method of manufacturing an electric machine is provided. The method may include stamping a fully-processed steel into a set of laminations having hardened outer edge areas. The method may further include flash annealing the laminations to create non-uniform heat distribution across the laminations to drive a hardness of the inner and outer edge areas toward a hardness of the central areas to relieve residual stress and decrease iron loss of the laminations.

According to yet another embodiment of this disclosure, a method of manufacturing an electric machine is provided. The method may include blanking a fully-processed steel into a set of laminations having hardened outer edges and piercing the set of laminations to define at least one aperture having hardened inner edge areas. The method may also include stacking the laminations to form a lamination assembly. The method may also include flash annealing the lamination assembly to concentrate thermal energy in the inner and outer edge areas relative to central areas of the laminations to drive a hardness of the inner and outer edge areas toward a hardness of the central areas to relieve residual stress and decrease iron loss of the laminations.

BRIEF DESCRIPTION OF THE DRAWINGS

FIG. 1 is a flow chart illustrating a prior art process that includes traditional stress relief annealing for electric steel.

FIG. 2 is a flow chart illustrating a process that includes a rapid heat treatment process for annealing electric steel.

FIG. 3 is a chart illustrating the temperature and duration for the rapid heat treatment process.

DETAILED DESCRIPTION

Figure 4:
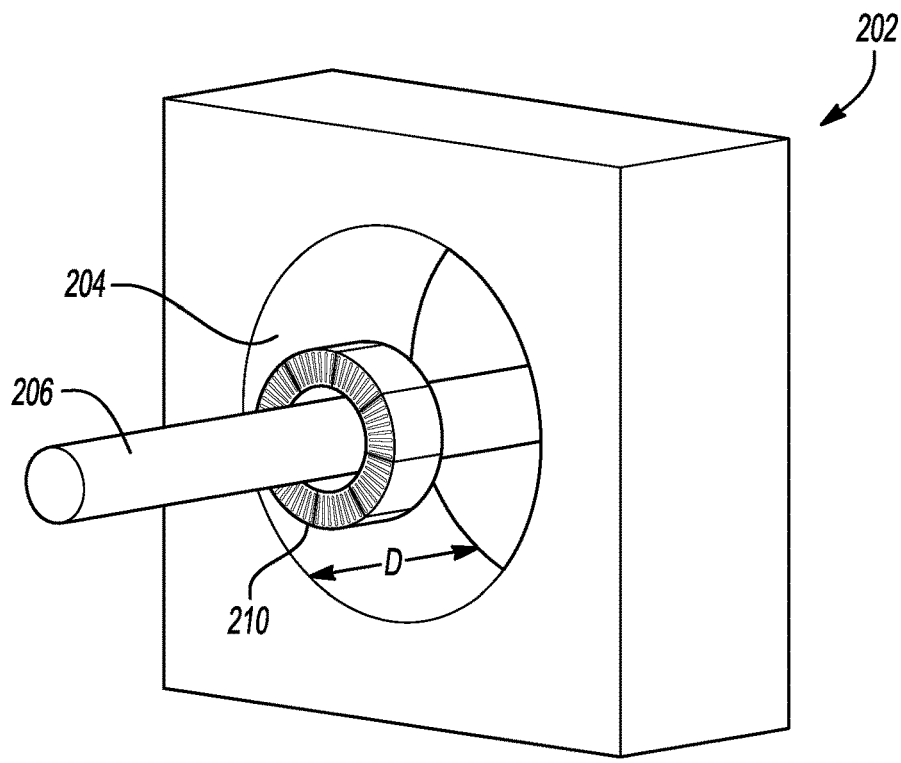
FIG. 4 is a perspective view of an example furnace and assembly undergoing the rapid heat treatment process.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrical steel is used in electrical applications to construct electrical devices such as power transformers, distributions transformers, and electric machines (motors and generators). Electrical steel may include a range of alloys that have favorable magnetic properties for electric machine construction. Iron alloys suitable for electrical steel may include a percentage of silicon up to 6.5%. Electrical steel is typically formed into sheets that may be cut or punched to form laminations. In use, cyclic variation of the applied magnetic field dissipates energy in the electrical steel, a phenomenon referred to as core loss. The efficiency of the electrical component may be increased by reducing the core loss in the electrical steel.

Electrical devices or components (e.g., stator, rotor, transformers) may be constructed of stacks of electrical steel sheets. Electrical devices may include electric machines, transformers, inductors, and other devices that are comprised of a laminated core. A flowchart of the conventional manufacturing process includes receiving a fully-processed electrical steel 12 and punching the electrical steel sheets to a finished shape by a punch and die 14. Fully-processed steel refers to electrical steel delivered with an insulating coating, full heat treatment, and defined magnetic properties. After punching 14, the laminations may be stacked and assembled as represented at 16. The punching process, that precedes operation 16, involves strong shearing forces at the cutting edge of the shapes and as a result plastic deformation exists in these regions. Plastic deformation or strain results in residual stress that affects the magnetic properties of the core. More specifically, core losses decrease the performance and efficiency of the electrical device. Core losses maybe referred to iron losses and are meant to be interchangeable.

Various techniques may be used to remove the residual stresses induced by the cutting process. For example, stress relief annealing (SRA) 18 may be used. SRA involves heat treating the punched electrical sheet or assembled core at elevated temperatures for an extended period of time. Previous stress relief annealing techniques subjected the stamped electrical sheet or assembly to a temperature of 750° for at least thirty minutes. Under certain circumstances, the time require for annealing could be upwards of 240 minutes. The lengthy time required for annealing increases cost because of the long cycle time. A vacuum or protective gas environment is required during SRA to prevent oxidation of the electrical steel.

Referring to FIG. 2, a flowchart illustrating a process 100 that includes rapid heat treatment is illustrated. Fully-processed electrical steel is received, as represented at 102, and punched into the desired shape and size, as represented at 104. As mentioned above, fully-processed steel refers to electrical steel delivered with an insulating coating, full heat treatment, and defined magnetic properties. After punching at 104, the laminations are stacked and assembled as represented at 106. The assembly may be for a rotor, a stator, or a transformer or any suitable components that make up an electric machine when assembled. The assembly or stack of laminations may then undergo a rapid heat treatment process as represented at 108. The stack of laminations may be assembled to other assemblies to form an electric machine or transformer, as represented at 110.

Now referring to FIGS. 3 and 4, a chart depicting the temperature and duration of the flash annealing heat treatment process is illustrated. The flash annealing heat treatment process may be carried out by placing the assembly 210 into a continuous annealing furnace 202. The continuous annealing furnace moves the assembly by displacing a rod 206 along the directional arrows D. The duration may be controlled by the speed at which the assembly is moved within the furnace or the amount of time the assembly is within the furnace, or both. Although a lamination assembly for a stator 210 is illustrated, the flash annealing process may be applied to various other assemblies for electric machines, e.g., transformer core or a rotor.

Figure 5A:
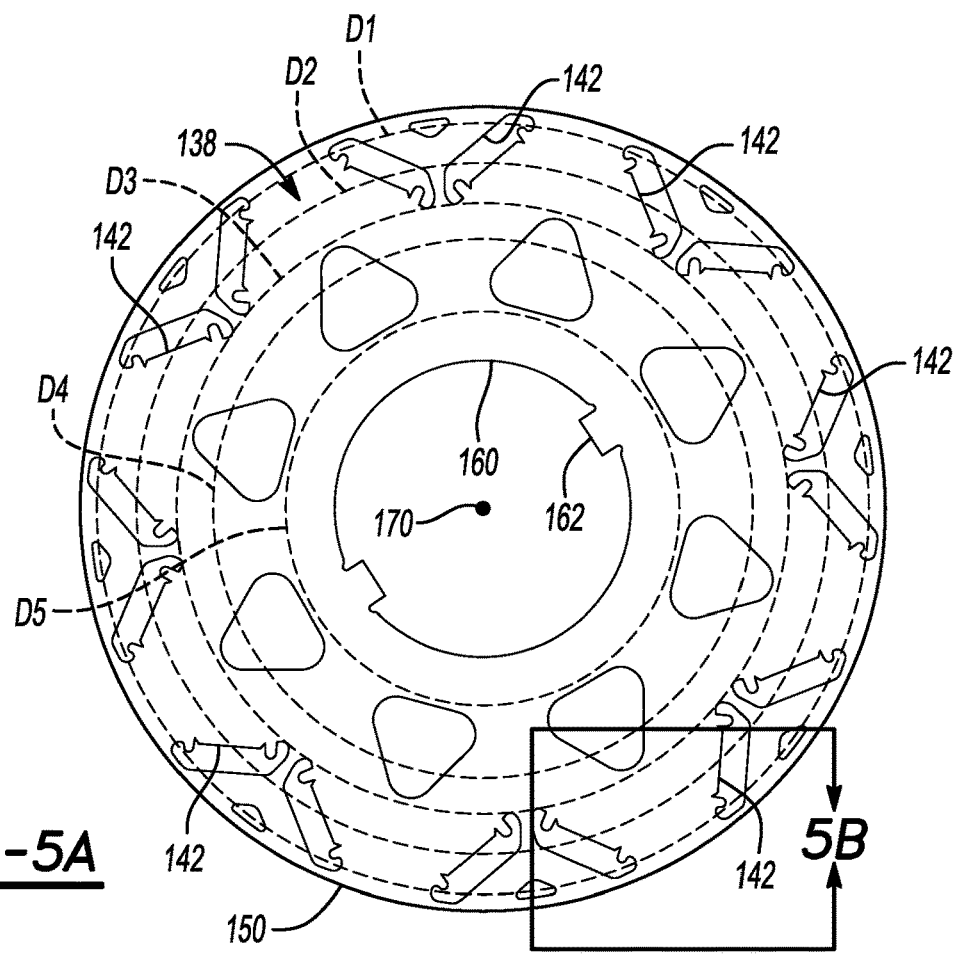
FIG. 5A is a top view of an example lamination and designated hardness measurement points.
Figure 5B:
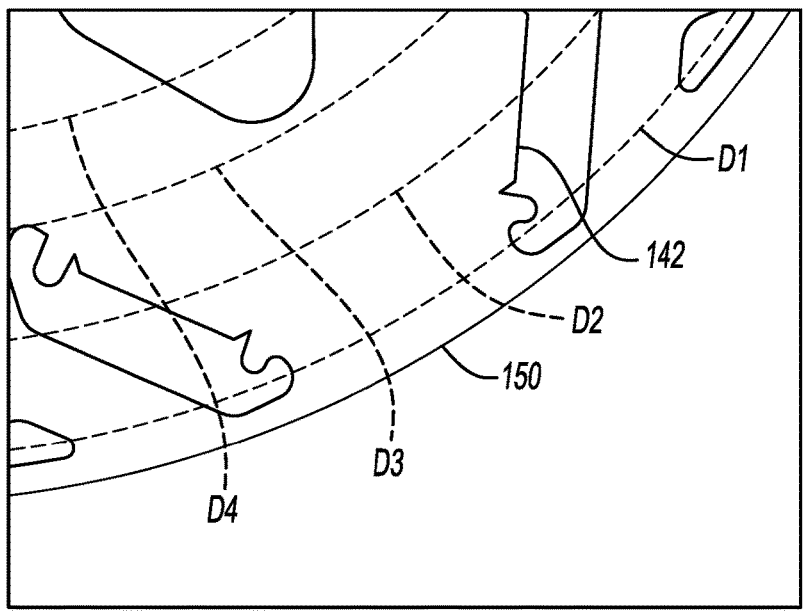
FIG. 5B is a detailed view taken along the lines 5B.
Figure 6:
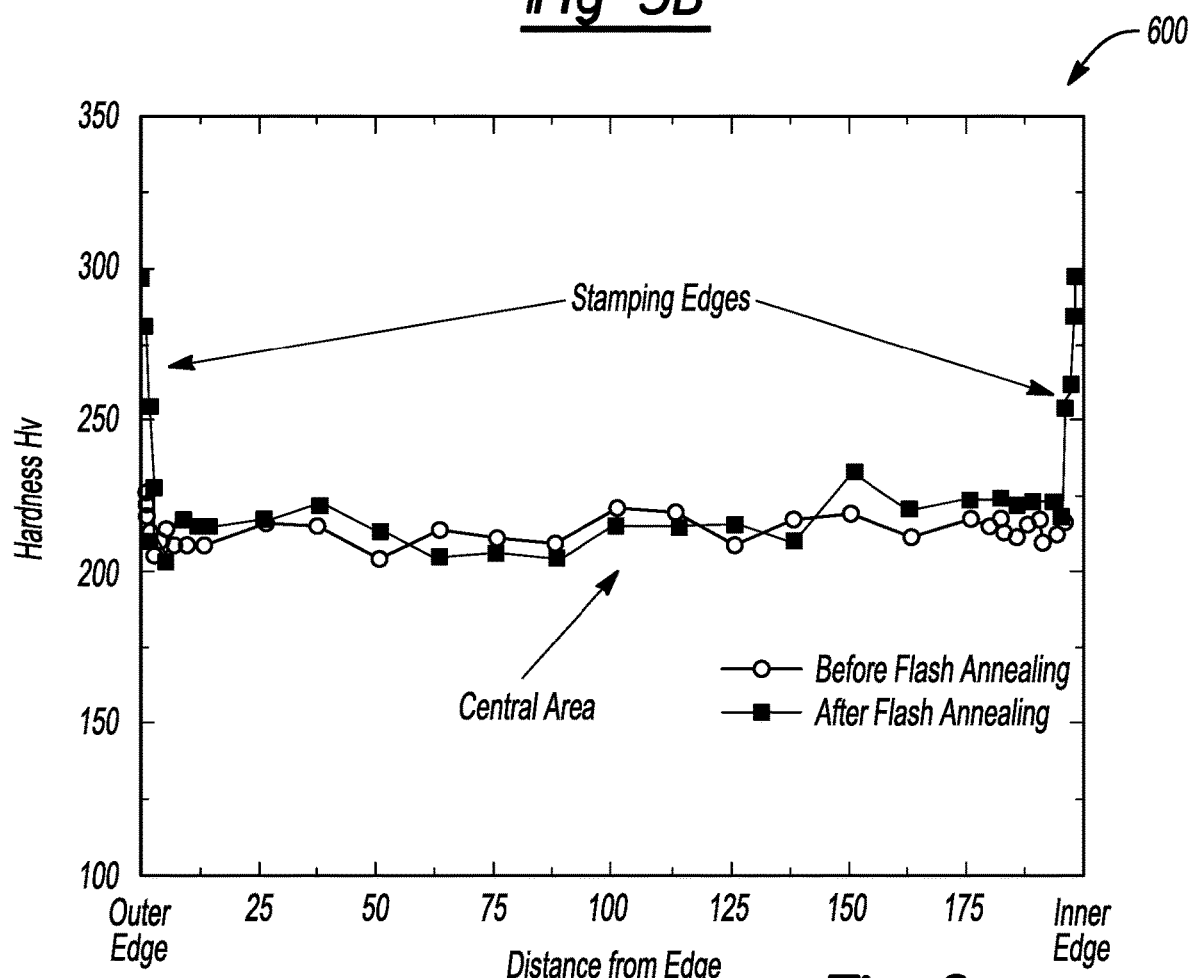
FIG. 6 is a graph of hardness measurements, before and after the flash annealing heat treatment process, at various locations of a lamination.

FIGS. 5A and 5B depict a top view of an example rotor lamination 138 and a detailed view taken along the lines B-B. FIG. 6 is a graph 600 depicting hardness measurements, taken before and after the flash annealing heat treatment process, at various locations along the laminations. The rotor lamination 138 is one of many that may be stacked to form a rotor core assembly 210, as depicted in FIG. 4. The lamination includes an inner edge 160 that defines a circular central opening for accommodating a drive shaft with a keyway that may receive a drive key 162. The rotor lamination 138 may define a plurality of magnet openings 142 that are symmetrically disposed with respect to adjacent pairs of magnet openings 142. The magnet openings 142 may be grouped in pairs with each of the pairs forming a V-shape. The lamination 138 includes an outer edge or periphery 150 that makes up the outermost portion of the lamination. Generally, the outer edge 150 is formed by a cutting or blanking operation and the central opening, inner edge 160, and magnet openings 142 may be formed by a piercing operation.

Five concentric dashed lines, D1, D2, D3, D4, and D5 are illustrated on the surface of the rotor lamination 138. Each of these dashed lines represent the linear distance between the outer edge or outer periphery 150 of the lamination 138. For example, the dashed line D1 is spaced apart from the outer edge 150 by approximately 12.5 mm. The dashed line D2 is spaced apart from the outer edge 150 by approximately 25 mm. The dashed line D3 is spaced apart from the outer edge 150 by approximately 50 mm. The dashed line D4 is spaced apart from the outer edge 150 by approximately 75 mm. Finally, the dashed line D5 is spaced apart from the outer edge 150 by approximately 175 mm. As will be described in greater detail below, these dashed lines correspond to the distance from edge denoted on the x-axis.

The graph 600 in FIG. 6 illustrates hardness (HV) at different locations on the lamination 138. An area near the stamped edges (outer edge 150 and inner edge 160) exhibiting an increased hardness relative to the hardness across the regions may be indicative of the presence of residual stress. As was previously mentioned, residual stress increases core loss that results in a decrease in the performance and efficiency of the electrical device. The hardness measurements are taken before and after the flash annealing heat treatment process. HV is a unit of measure for a Vickers hardness test. The Vickers hardness test is a common test to determine surface hardness of an object or to determine the hardness of a relatively thin material. The lamination illustrated has a thickness between 0.1 mm and 0.3 mm so the Vickers hardness test is more appropriate than another type of hardness test. For thicker components, another hardness test may be used.

A number of concentric hidden lines are disposed between the outer edge 150 and the circular central opening 160. The outer edge 150 corresponds to the location along the x-axis labeled outer edge in FIG. 5B and corresponds to the "0 mm." on the x-axis of the graph depicted in FIG. 6. As illustrated in the graph 600 the hardness before flash annealing heat treatment process of the area between 0 mm and 12.5 mm is between 250 HV and 300 HV. After the flash annealing heat treatment process, the hardness is reduced or normalized to have a range between 200 HV and 225 HV. Similarly, the area of the lamination between the inner edge 160 and the circle labeled 175 mm (FIG. 5A) has a hardness range (before the flash annealing heat treatment process) of 250 HV to 300 HV. After the flash annealing heat treatment process, the hardness is reduced or normalized between 200 HV and 225 HV.

Figure 7:
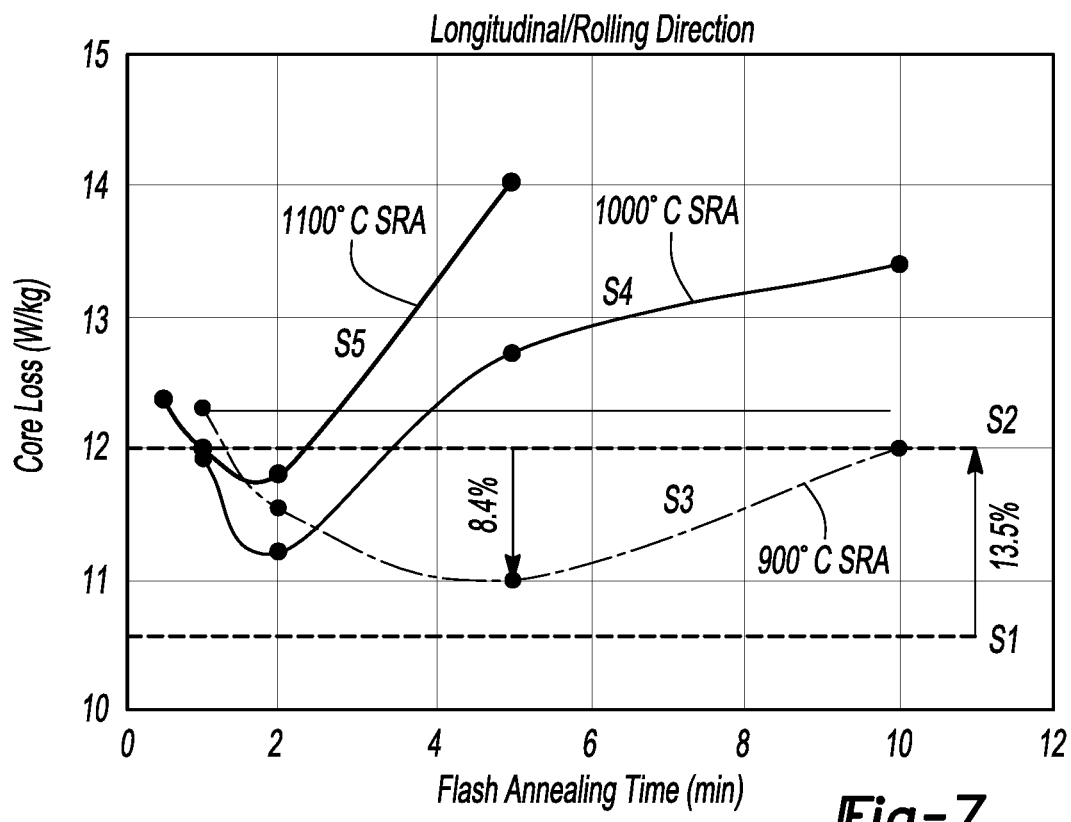
FIG. 7 and FIG. 8 are graphs illustrating the decrease in iron loss associated with flash annealed electrical steel.
Figure 8:
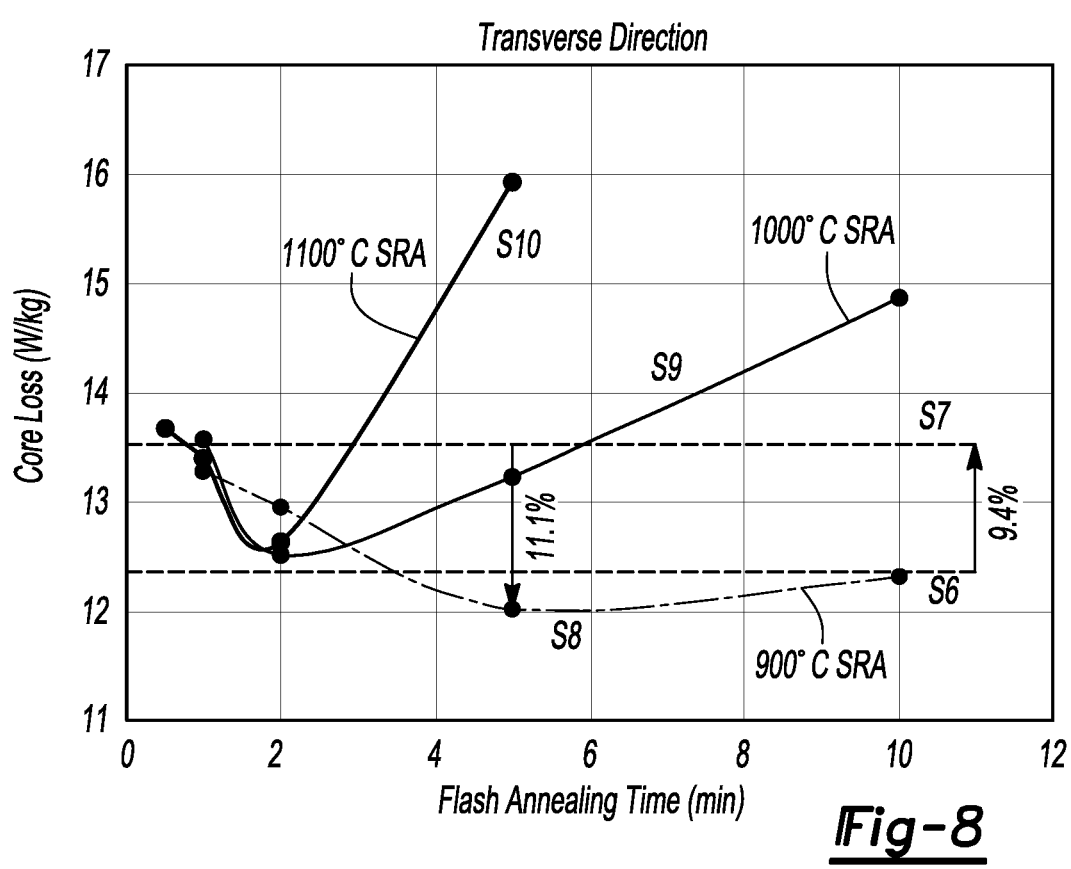

Now referring to FIG. 7 and FIG. 8, graphs depicting the reduction in iron loss versus time are illustrated. Each of the graphs include a y-axis that represents iron or core loss and an x-axis that represents the duration of the heat treatment. The graph in FIG. 7 depicts iron loss against the time of the rapid heat treatment for samples or components that are cut, stamped, or punched along the rolling direction. The graph in FIG. 8 depicts iron loss against the time of the rapid heat treatment for samples or components that are cut, stamped, or punched along the transverse direction. Steel coils are generally rolled to form the desired thickness of coil or sheet. The longitudinal direction is the direction at which the metal sheet moves through the coil. The transverse direction is angled approximately 90° with respect to the longitudinal direction.

Line S1 shown in FIG. 7 indicates the core loss (10.5 W/kg.) before punching the laminations, as represented by operation 104 in FIG. 2. The core loss 10.5 W/kg represents an average value taken from various samples. Line S2 indicates the core loss (12 W/kg.) after the punching operation, as represented by operation 104 in FIG. 2.

Line S3 represents the core loss for stacked laminations subjected to the flash annealing heat treatment process at a temperature of 900° C. The longitudinal steel placed in the furnace 202 (FIG. 4) set to 900° C., has a core loss of ~12.3 W/kg. after approximately one minute. The core loss drops after two minutes to ~11.7 W/kg and hits its lowest point at 11 W/kg after five minutes. The benefits of additional time in the oven are eliminated after the five-minute mark; the core loss increases linearly between five minutes (11 W/kg.) and ten minutes (12 W/kg.).

Line S4 represents the core loss for stacked laminations subjected to the flash annealing heat treatment process at a temperature of 1,000° C. The longitudinal steel placed in the furnace 202 (FIG. 4) set to 1,000° C., has a core loss of 12 W/kg. after approximately one minute. The core loss drops after two minutes, to its lowest point, approximately 11.3 W/kg. The core loss increases linearly between two minutes and five minutes 12.7 W/kg. The core loss increases further after 10 minutes to ~13.5 W/kg.

Line S5 represents the core loss for stacked laminations subjected to the flash annealing heat treatment process at a temperature of 1,100° C. The longitudinal steel placed in the furnace 202 (FIG. 4) set to 1,100° C., has a core loss of 12.3 W/kg. after approximately one minute. The core loss drops after two minutes, to its lowest point, approximately 11.8 W/kg. The core loss increases linearly between 2 minutes and five minutes 14 W/kg.

Now referring specifically to FIG. 8, line S6 indicates the core loss (12.4 W/kg.) before punching the laminations, as represented by operation 104 in FIG. 2. The core loss 12.4 W/kg represents an average value taken from various samples. Line S7 indicates the core loss (13.6 W/kg.) after the punching operation, as represented by operation 104 in FIG. 2. The core loss 13.6 W/kg represents an average value taken from various samples.

Line S8 represents the core loss for stacked laminations subjected to the flash annealing heat treatment process at a temperature of 900° C. The transverse steel placed in the furnace 202 (FIG. 4) set to 900° C., has a core loss of ~13.4 W/kg. after approximately one minute. The core loss drops after two minutes to ~13 W/kg. and hits its lowest point at 12 W/kg. after approximately 5 minutes. The core loss increases to approximately 12.3 W/kg. after ten minutes.

Line S9 represents the core loss for stacked laminations subjected to the flash annealing heat treatment process at a temperature of 1,000° C. The transverse steel placed in the furnace 202 (FIG. 4) set to 1,000° C., has a core loss of 13.6 W/kg. after approximately one minute. The core loss drops after two minutes, to its lowest point, approximately 12.4 W/kg. The core loss increases linearly between two minutes and five minutes to 13.3 W/kg. The core loss increases further after 10 minutes to ~14.9 W/kg.

Line S10 represents the core loss for stacked laminations subjected to the flash annealing heat treatment process at a temperature of 1,100° C. The transverse steel placed in the furnace 202 (FIG. 4) set to 1,100° C., has a core loss of ~13.8 W/kg. after approximately one minute. The core loss drops after two minutes, to its lowest point, approximately 12.5 W/kg. The core loss increases between two minutes and five minutes to 16 W/kg.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a stator assembly comprising:
   providing a fully-processed steel;
   stamping the fully-processed steel into a set of laminations having hardened inner and outer edge areas;
   stacking each of the laminations of the set of laminations on top of one another to form a stator assembly
   providing a furnace; and
   flash annealing by placing the stator assembly into the furnace having a temperature equal to or greater than 1000° C. for a duration between one minute and two minutes to concentrate thermal energy in the inner and outer edge areas relative to central areas of set of the laminations to drive a hardness of the inner and outer edge areas toward a hardness of the central areas to relieve residual stress and decrease iron loss of the set of laminations.

2. The method of claim 1 wherein the flash annealing is performed such that a mean grain size of the set of laminations after the flash annealing is within 20% of the mean grain size before the flash annealing.

3. The method of claim 1 wherein the furnace is a continuous annealing furnace, and wherein the flash annealing is accomplished by a placing the stator assembly in the continuous annealing furnace.

4. The method of claim 3 wherein the continuous annealing furnace includes infrared lamps.

5. The method of claim 1, further comprising stacking each of the laminations of the set of laminations on top of one another to form a stator assembly.

6. A method of manufacturing a stator assembly comprising:
   providing a fully-processed steel;
   stamping the fully-processed steel into a set of laminations having hardened inner and outer edge areas;
   stacking each of the laminations of the set of laminations on top of one another to form a stator assembly
   providing a furnace; and
   flash annealing by placing the stator assembly into the furnace having a temperature between 901° C. and 999° C. for a duration between two and five minutes to concentrate thermal energy in the inner and outer edge areas relative to central areas of set of the laminations to drive a hardness of the inner and outer edge areas toward a hardness of the central areas to relieve residual stress and decrease iron loss of the set of laminations.

7. The method of claim 6 wherein the furnace is a continuous annealing furnace, and wherein the flash annealing is accomplished by a placing the stator assembly in a continuous annealing furnace.

8. The method of claim 7 wherein the continuous annealing furnace includes infrared lamps.

9. A method of manufacturing a stator assembly comprising:
   providing a fully-processed steel;

stamping the fully-processed steel into a set of laminations having hardened inner and outer edge areas;

stacking each of the laminations of the set of laminations on top of one another to form a stator assembly providing a furnace; and flash annealing by placing the stator assembly into the furnace having a temperature of 900° C. for a duration between five and ten minutes to concentrate thermal energy in the inner and outer edge areas relative to central areas of set of the laminations to drive a hardness of the inner and outer edge areas toward a hardness of the central areas to relieve residual stress and decrease iron loss of the set of laminations.

10. The method of claim 9 wherein the furnace is a continuous annealing furnace, and wherein the flash annealing is accomplished by a placing the stator assembly in a continuous annealing furnace.

11. The method of claim 10 wherein the continuous annealing furnace includes infrared lamps.

\* \* \* \* \*